US010795837B2

(12) United States Patent
Sadowski et al.

(10) Patent No.: US 10,795,837 B2
(45) Date of Patent: Oct. 6, 2020

(54) ALLOCATION OF MEMORY BUFFERS IN COMPUTING SYSTEM WITH MULTIPLE MEMORY CHANNELS

(71) Applicant: Advanced Micro Devices, Inc., Santa Clara, CA (US)

(72) Inventors: Greg Sadowski, Boxborough, MA (US); Philip J. Rogers, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/958,805

(22) Filed: Apr. 20, 2018

(65) Prior Publication Data

US 2018/0239722 A1    Aug. 23, 2018

Related U.S. Application Data

(63) Continuation of application No. 12/881,663, filed on Sep. 14, 2010, now abandoned.

(51) Int. Cl.
*G06F 12/00* (2006.01)
*G06F 13/00* (2006.01)
*G06F 13/16* (2006.01)

(52) U.S. Cl.
CPC ...... *G06F 13/1673* (2013.01); *G06F 13/1684* (2013.01); *Y02D 10/14* (2018.01)

(58) Field of Classification Search
CPC .. G06F 13/1673; G06F 13/1684; Y02D 10/14
(Continued)

(56) References Cited

U.S. PATENT DOCUMENTS 4,530,090 A * 7/1985 Priamo ............ H04Q 11/0407
                                                          370/378
4,912,698 A * 3/1990 Bitzinger ............... G06F 11/10
                                                          370/244
(Continued)

FOREIGN PATENT DOCUMENTS

EP        1513071 A2    3/2005
JP     2002-342266 A   11/2002
(Continued)

OTHER PUBLICATIONS

International Search Report and Written Opinion, dated Dec. 7, 2011, for PCT Appln. No. PCT/US2011/051156, 9 pages.

*Primary Examiner* — Sheng Jen Tsai
(74) *Attorney, Agent, or Firm* — Volpe and Koenig, P.C.

(57) ABSTRACT

A method, computer program product, and system are provided for associating one or more memory buffers in a computing system with a plurality of memory channels. The method can include associating a first memory buffer to a first plurality of memory banks, where the first plurality of memory banks spans over a first set of one or more memory channels. Similarly, the method can include associating a second memory buffer to a second plurality of memory banks, where the second plurality of memory banks spans over a second set of one or more memory channels. The method can also include associating a first sequence identifier and a second sequence identifier with the first memory buffer and the second memory buffer, respectively. Further, the method can include accessing the first and second memory buffers based on the first and second sequence identifiers.

20 Claims, 6 Drawing Sheets

(58) Field of Classification Search
USPC .................................................... 711/5, 105
See application file for complete search history.

(56) References Cited

U.S. PATENT DOCUMENTS

| | | | | |
|---|---|---|---|---|
| 4,928,234 A * | 5/1990 | Kitamura | ............ | G06F 13/1647 711/150 |
| 4,970,666 A * | 11/1990 | Welsh | ............ | G06T 15/20 345/423 |
| 5,392,443 A * | 2/1995 | Sakakibara | ............ | G06F 12/0607 708/520 |
| 5,526,507 A * | 6/1996 | Hill | ............ | G06F 3/0601 711/114 |
| 6,032,219 A * | 2/2000 | Robinson | ............ | G06F 3/0613 711/1 |
| 6,260,088 B1 * | 7/2001 | Gove | ............ | G06F 15/17375 710/100 |
| 6,347,344 B1 * | 2/2002 | Baker | ............ | G06F 13/102 345/501 |
| 6,347,366 B1 * | 2/2002 | Cousins | ............ | G06F 9/5016 711/156 |
| 6,377,268 B1 * | 4/2002 | Jeddeloh | ............ | G06F 9/5016 345/531 |
| 6,401,176 B1 * | 6/2002 | Fadavi-Ardekani | ............ | G06F 13/1663 710/240 |
| 6,658,546 B2 * | 12/2003 | Calvignac | ............ | H04L 49/90 370/429 |
| 6,678,813 B1 * | 1/2004 | Le | ............ | G06F 5/065 710/56 |
| 6,769,047 B2 * | 7/2004 | Kurupati | ............ | G11C 7/1078 711/104 |
| 6,948,030 B1 * | 9/2005 | Gupta | ............ | G06F 5/065 365/189.03 |
| 6,965,974 B1 * | 11/2005 | Bays | ............ | G06F 12/0607 711/153 |
| 7,003,628 B1 * | 2/2006 | Wiedenman | ............ | G06F 12/0859 711/118 |
| 7,240,143 B1 * | 7/2007 | Scheffler | ............ | G06F 12/0284 711/121 |
| 7,360,035 B2 * | 4/2008 | Jenkins | ............ | G06F 13/1652 711/150 |
| 7,747,989 B1 * | 6/2010 | Kissell | ............ | G06F 9/45516 717/148 |
| 7,991,921 B2 * | 8/2011 | Fischer | ............ | G06F 1/3203 710/8 |
| 8,065,493 B2 * | 11/2011 | Burchard | ............ | G06F 13/1673 711/154 |
| 8,510,496 B1 * | 8/2013 | Totolos, Jr. | ............ | G06F 3/0613 711/147 |
| 2001/0007533 A1 * | 7/2001 | Kobayashi | ............ | G11C 7/1078 365/185.11 |
| 2001/0007538 A1 * | 7/2001 | Leung | ............ | G06F 12/0893 365/222 |
| 2001/0011356 A1 * | 8/2001 | Lee | ............ | G06F 1/3203 713/322 |
| 2002/0050959 A1 * | 5/2002 | Buckelew | ............ | G09G 5/39 345/55 |
| 2002/0118693 A1 * | 8/2002 | Calvignac | ............ | H04L 49/90 370/422 |
| 2002/0145611 A1 * | 10/2002 | Dye | ............ | G09G 5/14 345/543 |
| 2002/0184455 A1 | 12/2002 | Cho | | |
| 2003/0016578 A1 * | 1/2003 | Janik | ............ | G11C 29/26 365/201 |
| 2003/0084246 A1 * | 5/2003 | Tran | ............ | H04L 49/3027 711/122 |
| 2003/0110329 A1 * | 6/2003 | Higaki | ............ | G06F 9/4843 710/36 |
| 2004/0030849 A1 * | 2/2004 | Borkenhagen | ............ | G06F 13/1647 711/156 |
| 2004/0078532 A1 * | 4/2004 | Tremaine | ............ | G06F 9/5016 711/160 |
| 2004/0133754 A1 * | 7/2004 | Zsohar | ............ | G06F 13/1626 711/157 |
| 2004/0177216 A1 * | 9/2004 | Asari | ............ | G06F 12/0246 711/103 |
| 2005/0080874 A1 * | 4/2005 | Fujiwara | ............ | H04L 67/1097 709/217 |
| 2005/0086425 A1 * | 4/2005 | Okuno | ............ | G06F 13/1673 711/105 |
| 2005/0108492 A1 * | 5/2005 | Zsohar | ............ | G06F 13/1626 711/167 |
| 2005/0160406 A1 * | 7/2005 | Duncan | ............ | G06T 1/60 717/127 |
| 2005/0253858 A1 * | 11/2005 | Ohkami | ............ | G06F 12/0862 345/531 |
| 2006/0012603 A1 * | 1/2006 | Lindholm | ............ | G06F 9/3012 345/543 |
| 2006/0221945 A1 * | 10/2006 | Chin | ............ | H04L 49/103 370/381 |
| 2006/0268649 A1 * | 11/2006 | Tokieda | ............ | G11C 8/12 365/230.03 |
| 2007/0002880 A1 * | 1/2007 | Chien | ............ | H04L 49/90 370/412 |
| 2007/0147115 A1 * | 6/2007 | Lin | ............ | G06F 13/1694 365/185.08 |
| 2007/0180216 A1 * | 8/2007 | Brown | ............ | G06F 12/109 711/202 |
| 2008/0147915 A1 * | 6/2008 | Kleymenov | ............ | G06F 9/5016 710/52 |
| 2009/0055580 A1 * | 2/2009 | Moscibroda | ............ | G06F 13/1642 711/104 |
| 2009/0077403 A1 * | 3/2009 | Hayashi | ............ | G06F 1/3203 713/320 |
| 2009/0164677 A1 * | 6/2009 | Ware | ............ | G06F 13/4243 710/104 |
| 2009/0172499 A1 * | 7/2009 | Olbrich | ............ | G06F 13/1657 714/773 |
| 2009/0234989 A1 * | 9/2009 | Fischer | ............ | G06F 1/3203 710/56 |
| 2009/0248922 A1 * | 10/2009 | Hinohara | ............ | G06F 9/5016 710/56 |
| 2009/0249393 A1 * | 10/2009 | Shelton | ............ | H04N 5/445 725/39 |
| 2009/0322784 A1 * | 12/2009 | Sartori | ............ | H04N 21/426 345/619 |
| 2009/0327596 A1 * | 12/2009 | Christenson | ............ | G06F 13/1684 711/105 |
| 2010/0169519 A1 * | 7/2010 | Zhang | ............ | G06F 12/0284 710/56 |
| 2011/0022791 A1 * | 1/2011 | Iyer | ............ | G06F 12/08 711/105 |
| 2011/0060868 A1 * | 3/2011 | Haukness | ............ | G06F 12/0246 711/103 |
| 2011/0296120 A1 * | 12/2011 | Khan | ............ | G06F 9/54 711/155 |
| 2011/0296415 A1 * | 12/2011 | Khan | ............ | G06F 9/544 718/100 |
| 2011/0302376 A1 * | 12/2011 | Zhou | ............ | G11C 8/16 711/149 |
| 2012/0201088 A1 * | 8/2012 | Rajan | ............ | G11C 7/10 365/193 |
| 2013/0339631 A1 * | 12/2013 | Ware | ............ | G06F 12/02 711/147 |
| 2014/0192583 A1 * | 7/2014 | Rajan | ............ | G11C 7/10 365/63 |

FOREIGN PATENT DOCUMENTS

| | | |
|---|---|---|
| JP | 2008-060700 A | 3/2008 |
| JP | 2008-287717 A | 11/2008 |
| WO | 2006/134550 A2 | 12/2006 |

* cited by examiner

ALLOCATION OF MEMORY BUFFERS IN COMPUTING SYSTEM WITH MULTIPLE MEMORY CHANNELS

CROSS REFERENCE TO RELATED APPLICATION

This application is a continuation of U.S. patent application Ser. No. 12/881,663, filed Sep. 14, 2010, which is incorporated by reference as if fully set forth.

FIELD OF INVENTION

Embodiments of the present invention generally relate to allocating one or more memory buffers in a computing system with a plurality of memory channels.

BACKGROUND

Due to the demand for increasing processing speed and volume, many computer systems employ multiple client devices (e.g., computing devices). In typical computer systems with multiple client devices, each of the client devices can communicate with multiple memory devices via a system bus. A source of inefficiency in the system bus relates to a recovery time period of a memory device when the client devices request successive data transfers from the same memory bank of the memory device (also referred to herein as "memory bank contention"). The recovery time period refers to a delay time exhibited by the memory device between a first access and an immediately subsequent second access to the memory device. While the memory device accesses data, no data can be transferred on the system bus during the recovery time period, thus leading to inefficiency in the system bus.

Since the system bus can only be used by one client device at a time, one approach to improve bus efficiency involves interleaving memory addresses within the multiple memory devices on the system bus. When the memory addresses are interleaved on the system bus, successive memory storage locations (e.g., memory locations having consecutive addresses) are placed in separate memory devices. By placing successive memory locations in separate memory devices, the effects from the recovery time period for a given memory device, and thus memory bank contention, can be reduced.

However, in a computer system with multiple client devices, interleaving memory addresses within the multiple memory devices may not lead to an optimal use of the system bus. In particular, the system bus typically enters an arbitration state to determine which of the client devices can access the system bus and interleaved memory addresses within the multiple memory devices. For instance, the arbitration state can allow a first client device to access the system bus and successive memory locations within the multiple memory devices prior to a second client device. However, the arbitration state cannot guarantee that the second client device will immediately access the same successive memory locations as the first client device, thus compromising the benefits of the interleaved memory architecture (e.g., reduction of memory bank contention).

Methods and systems are needed to reduce, or eliminate, memory bank contention in computer systems with multiple client devices.

SUMMARY

Embodiments of the present invention include a method for allocating one or more memory buffers in a computing system with a plurality of memory channels. The method can include the following: allocating a first memory buffer to a first plurality of memory banks, where the first plurality of memory banks spans over a first set of one or more memory channels; allocating a second memory buffer to a second plurality of memory banks, where the second plurality of memory banks spans over a second set of one or more memory channels; associating a first sequence identifier and a second sequence identifier with the first memory buffer and the second memory buffer, respectively; and, accessing the first and second memory buffers based on the first and second sequence identifiers. The method can also include executing a first memory operation associated with the first memory buffer at a first operating frequency. Similarly, the method can include executing a second memory operation associated with the second memory buffer at a second operating frequency, where the first operating frequency is different from the second operating frequency.

Embodiments of the present invention additionally include a computer program product that includes a computer-usable medium having computer program logic recorded thereon for enabling a processor to allocate one or more memory buffers in a computing system with a plurality of memory channels. The computer program logic can include the following: first computer readable program code that enables a processor to allocate a first memory buffer to a first plurality of memory banks, where the first plurality of memory banks spans over a first set of one or more memory channels; second computer readable program code that enables a processor to allocate a second memory buffer to a second plurality of memory banks, where the second plurality of memory banks spans over a second set of one or more memory channels; third computer readable program code that enables a processor to associate a first sequence identifier and a second sequence identifier with the first memory buffer and the second memory buffer, respectively; and, fourth computer readable program code that enables a processor to access the first and second memory buffers based on the first and second sequence identifiers. The computer program logic can also include the following: fifth computer readable program code that enables a processor to execute a first memory operation associated with the first memory buffer at a first operating frequency; and, sixth computer readable program code that enables a processor to execute a second memory operation associated with the second memory buffer at a second operating frequency, where the first operating frequency is different from the second operating frequency.

Embodiments of the present invention further include a computing system. The computing system can include a first client device, a second client device, a plurality of memory channels, and a memory controller. The plurality of memory channels can include a plurality of memory devices (e.g., Dynamic Random Access Memory (DRAM) devices). The memory controller is configured to communicatively couple the first and second client devices to the plurality of memory channels. The memory controller is also configured to perform the following functions: allocate a first memory buffer to a first plurality of memory banks, where the first plurality of memory banks spans over a first set of one or more memory channels; allocate a second memory buffer to a second plurality of memory banks, where the second plurality of memory banks spans over a second set of one or more memory channels; associate a first sequence identifier and a second sequence identifier with the first memory buffer and the second memory buffer, respectively; and, access the first and second memory buffers based on the first and second sequence identifiers. Further, the memory controller is also configured to execute a first memory operation associated with the first memory buffer at a first operating frequency and to execute a second memory operation associated with the second memory buffer at a second operating frequency, where the first operating frequency is different from the second operating frequency.

Further features and advantages of the invention, as well as the structure and operation of various embodiments of the present invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

DETAILED DESCRIPTION OF THE PREFERRED EMBODIMENTS

The following detailed description refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Thus, the operational behavior of embodiments of the present invention will be described with the understanding that modifications and variations of the embodiments are possible, given the level of detail presented herein.

Figure 1:
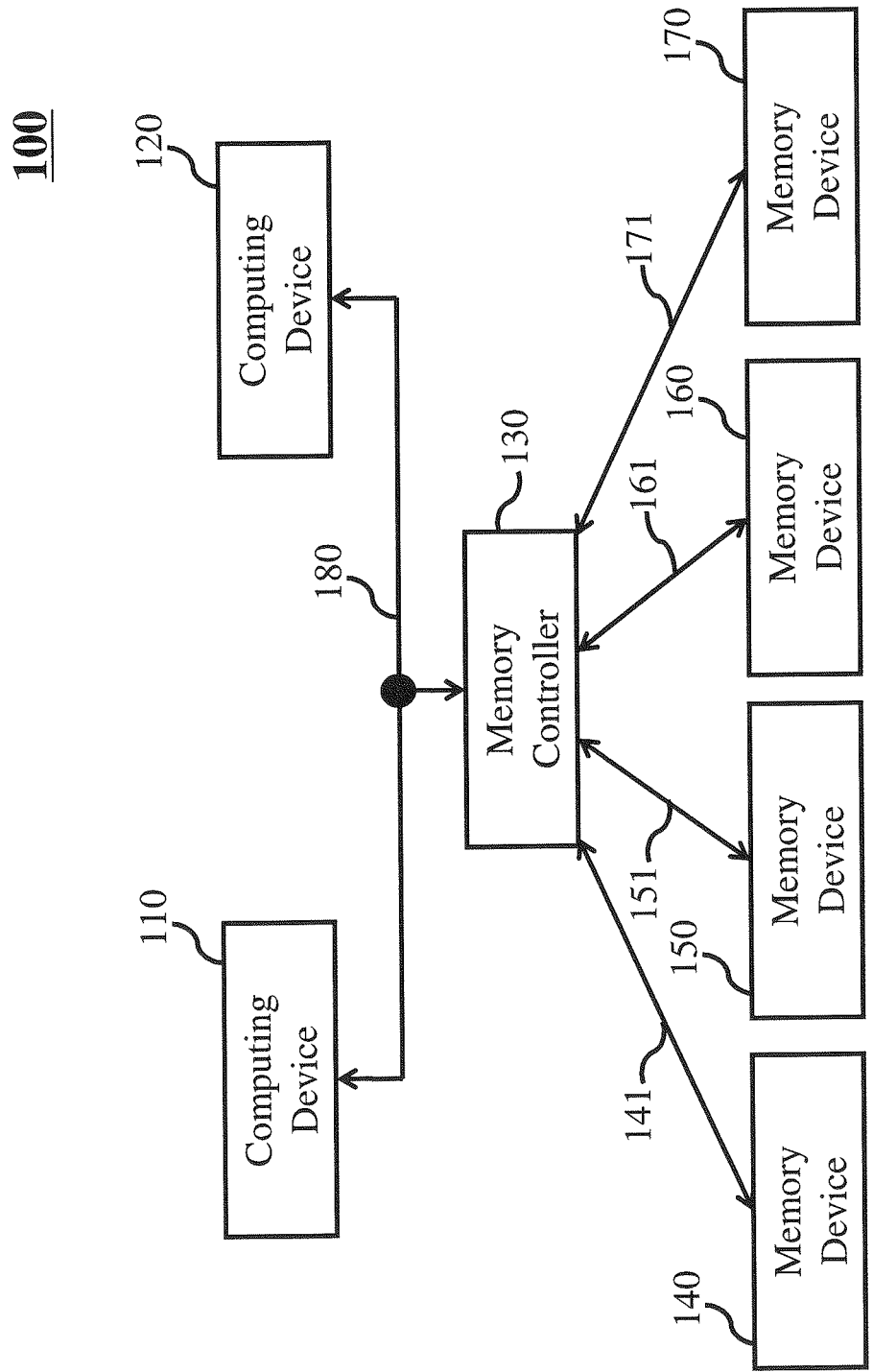
FIG. 1 is an illustration of an exemplary system with multiple client devices in which embodiments of the present invention can be implemented.

FIG. 1 is an illustration of an embodiment of a multi-client computing system 100. Multi-client computing system 100 includes a first computing device 110, a second computing device 120, a memory controller 130, and memory devices 140, 150, 160 and 170. First and second computing devices 110 and 120 are communicatively coupled to memory controller 130 via a system bus 180. Also, memory controller 130 is communicatively coupled to memory devices 140, 150, 160, and 170 via data buses 141, 151, 161, and 171, respectively. Memory devices 140, 150, 160, and 170 are also referred to herein as memory channels 140, 150, 160, and 170.

Based on the description herein, a person skilled in the relevant art will recognize that multi-client computing system 100 can include more or less than two computing devices, more than one memory controller, more or less than four memory devices, or a combination thereof. These different configurations of multi-client computing system 100 are within the scope and spirit of the embodiments described herein. However, for ease of explanation, the embodiments contained herein will be described in the context of the system architecture depicted in FIG. 1.

In an embodiment, each of computing devices 110 and 120 can be, for example and without limitation, a central processing unit (CPU), a graphics processing unit (GPU), an application-specific integrated circuit (ASIC) controller, other similar types of processing units, or a combination thereof. Computing devices 110 and 120 are configured to execute instructions and to carry out operations associated with multi-client computing system 100. For instance, multi-client computing system 100 can be configured to render and display graphics. Multi-client computing system 100 can include a CPU (e.g., computing device 110) and a GPU (e.g., computing device 120), where the GPU can be configured to render two- and three-dimensional graphics and the CPU can be configured to coordinate the display of the rendered graphics onto a display device (not shown in FIG. 1). Computing devices 110 and 120 can be separate devices (e.g., separate semiconductor integrated circuits or separate "chips"), separate devices in the same package, combined devices on a single device (e.g., devices on a single semiconductor device), or variants thereof.

In reference to FIG. 1, each of memory devices 140, 150, 160, and 170 is a Dynamic Random Access Memory (DRAM) device with four memory banks (e.g., memory banks 0-3 in FIG. 2 below), according to an embodiment of the present invention. Based on the description herein, a person skilled in the relevant art will recognize that memory devices 140, 150, 160, and 170 can be other types of memory devices such as, for example and without limitation, Static Random Access Memory devices (SRAMs), Static DRAMs, Flash memory devices, or a combination thereof.

Figure 2:
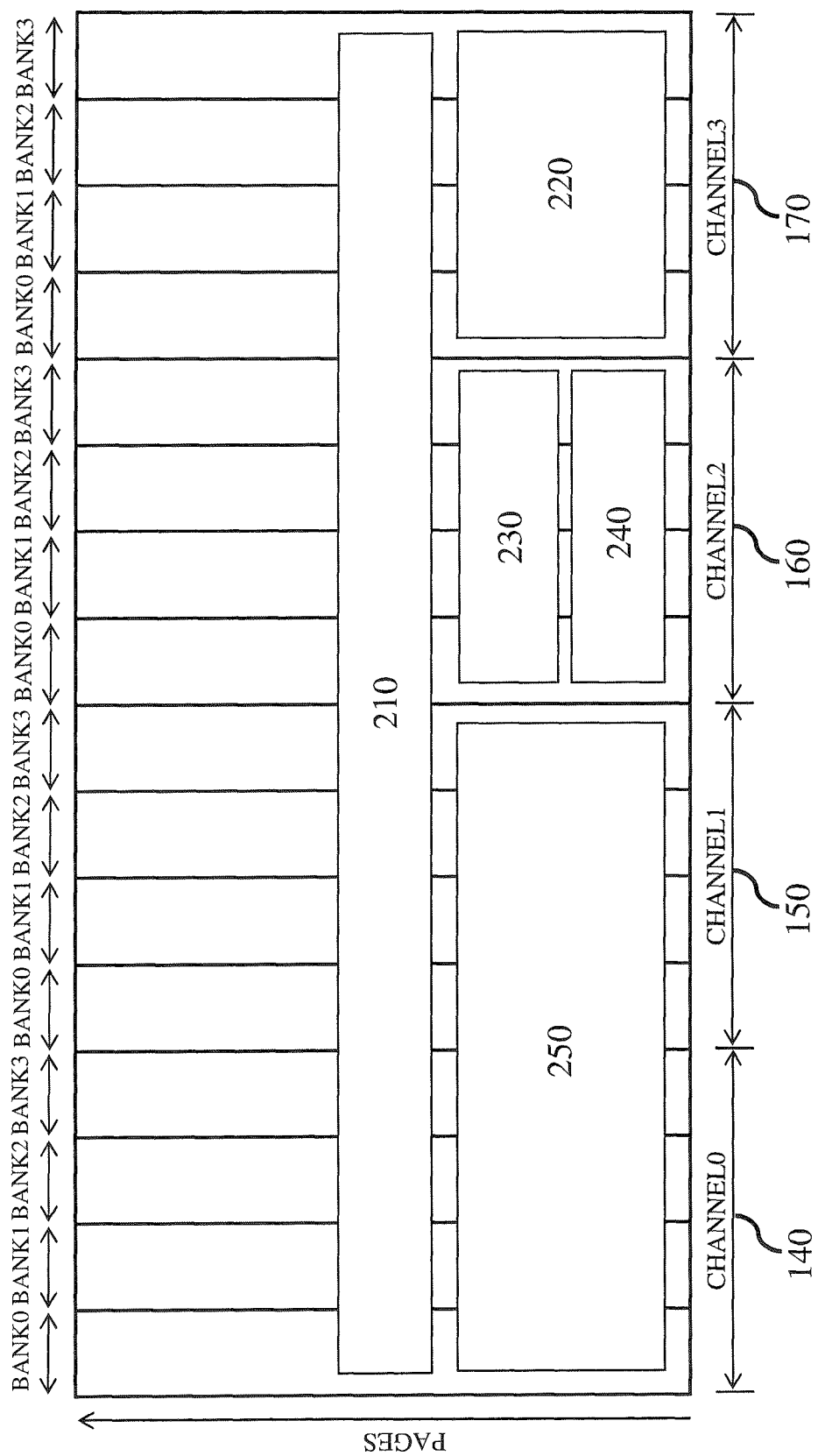
FIG. 2 is an illustration of an embodiment of a plurality of memory buffers that spans over a plurality of memory channels.

In an embodiment, one or more memory buffers are allocated to, or associated with, a plurality of memory banks, where the plurality of memory banks can span over one or more memory channels. FIG. 2 is an illustration of an embodiment of a plurality of memory buffers 210, 220, 230, 240, and 250 that spans over a plurality of memory channels 140, 150, 160, and 170. For instance, memory buffer 210 spans over memory banks 0-3 in memory channels 140, 150, 160, and 170, memory buffer 220 spans over memory banks 0-3 in memory channel 170, memory buffers 230 and 240 span over memory banks 0-3 in memory channel 160, and memory buffer 250 spans over memory banks 0-3 in memory channels 140 and 150. The plurality of memory buffers 210-250 is interleaved over one or more memory banks in memory channels 140-170, according to an embodiment of the present invention. Methods and techniques for interleaving memory addresses over a plurality of memory banks are known to a person of ordinary skill in the relevant art.

Figure 3:
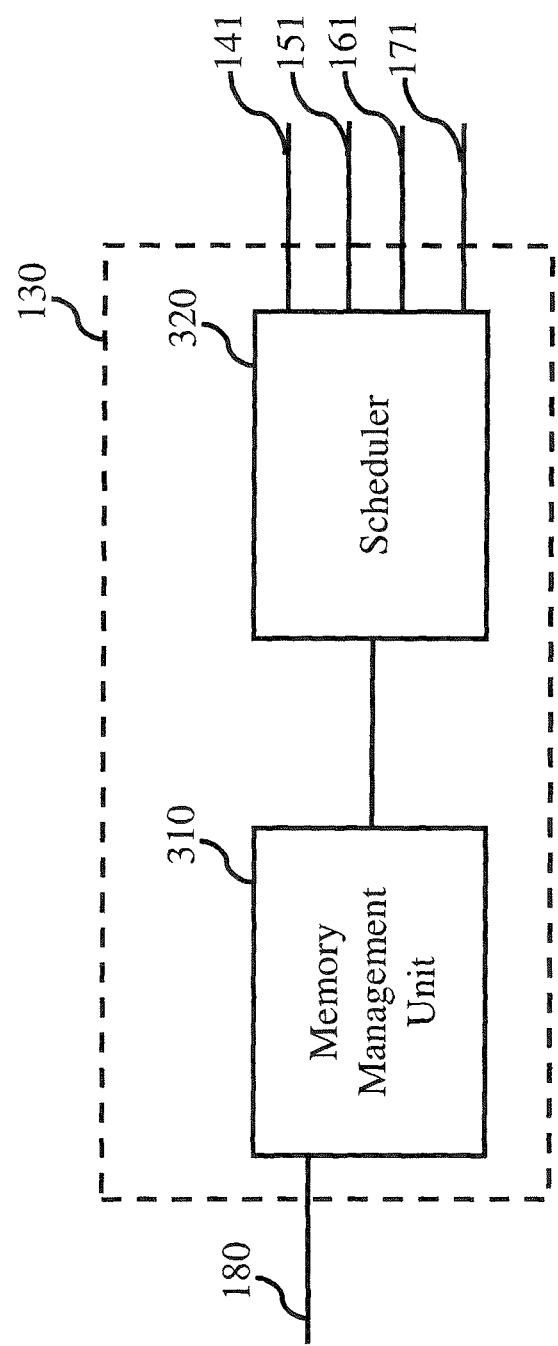
FIG. 3 is an illustration of an embodiment of a memory controller.

In reference to FIG. 1, when executing instructions and carrying out operations associated with multi-client computing system 100, computing devices 110 and 120 can access information stored in memory devices 140, 150, 160, and 170 via memory controller 130. FIG. 3 is an illustration of an embodiment of memory controller 130. Memory controller 130 includes a memory management unit 310 and a scheduler 320.

A function of memory management unit 310, among others, is to allocate, or associate, one or more memory buffers to operations associated with computing devices 110 and 120. In an embodiment, memory management unit 310 allocates (or associates) memory buffers at a memory channel/memory bank granularity. This granularity refers to a number of memory channels and a number of memory banks (within the memory channels) that are allocated to the one or more memory buffers. In an embodiment, the granularity can be dictated by computing devices 110 and 120, as described in further detail below.

In an embodiment, memory management unit 310 is configured to allocate, or associate, a first memory buffer to a first plurality of memory banks, where the first plurality of memory banks spans over a first set of one or more memory channels. An example of the first memory buffer is memory buffer 220 of FIG. 2. Memory management unit 310 is also configured to allocate, or associate, a second memory buffer to a second plurality of memory banks, where the second plurality of memory banks spans over a second set of one or more memory channels, according to an embodiment of the present invention. An example of the second memory buffer is memory buffer 250 of FIG. 2. In an embodiment, the second plurality of memory banks is different from the first plurality of memory banks. For instance, memory buffer 220 occupies a different plurality of memory banks from memory buffer 250. In another embodiment, the second plurality of memory banks is the same as the first plurality of memory banks. For instance, memory buffer 230 occupies the same plurality of memory banks as memory buffer 240 of FIG. 2.

As would be understood by a person skilled in the relevant art, memory buffers in computing systems (e.g., multi-client computing system 100) are typically used when moving data between operations or processes executed by computing devices (e.g., computing devices 110 and 120 of FIG. 1). In an embodiment, computing device 110 is a CPU and the first plurality of memory banks is allocated to the first memory buffer (e.g., memory buffer 220 of FIG. 2). Memory buffers required to execute latency-sensitive CPU instruction code can be mapped to the first memory buffer, according to an embodiment of the present invention. A benefit, among others, of mapping latency-sensitive CPU instruction code to the first memory buffer is that memory bank contention issues can be reduced, or avoided, between computing devices 110 and 120.

In an embodiment, computing device 120 is a GPU and the second memory buffer (e.g., memory buffer 250 of FIG. 2) can be used in the execution of operations by computing device 120. For instance, frame memory buffers required to execute graphics operations can be mapped to the second memory buffer. Since one or more memory banks are dedicated to GPU operations, a benefit, among others, of the second memory buffer is that memory bank contention issues can be reduced, or avoided, between computing devices 110 and 120.

In another embodiment, the first and second memory buffers can be used in the execution of operations by computing device 110 or computing device 120. In an embodiment, computing device 110 is a GPU and the first and second memory buffers can be used in the execution of operations by computing device 110. For instance, memory buffer 210 of FIG. 2 can be allocated to GPU operations associated with frame buffering, memory buffers 220, 230, and 240 can be allocated to GPU operations associated with video decoding, and memory buffer 250 can be allocated to GPU operations associated with a static screen state. Based on the description herein, a person skilled in the relevant art will recognize that memory buffers 210-250 of FIG. 2 can be allocated to other GPU operations, which are within the scope and spirit of the embodiments described herein. Also, based on the description herein, a person skilled in the relevant art will recognize that memory buffers 210-250 can be allocated to operations associated with other types of computing devices (e.g., CPUs and ASIC controllers), which are within the scope and spirit of the embodiments described herein.

A benefit, among others, in allocating memory buffers 210-250 across all of the memory channels in multi-computing system 100 of FIG. 1 (e.g., memory channels 140-170 of FIG. 2) is not only that memory bank contention issues can be reduced, or avoided, but also that the full bandwidth of the memory channels can be utilized. In using the full bandwidth of the memory channels in multi-client computing system 100, both power and efficiency in multi-client computing system 100 are improved.

In reference to FIG. 3, memory management unit 310 is configured to allocate one or more memory buffers to operations associated with computing devices 110 and 120 of FIG. 1 in such a manner as to minimize "holes" in the memory space. A "hole" refers to a situation in which an available memory buffer is smaller than requested by computing device 110 or computing device 120, and the requested memory buffer is allocated to a higher address space. This, as a result, leaves an available memory buffer space unused. In an embodiment, memory management unit 310 is configured to maintain an accounting and status of the memory buffers in order to minimize, or avoid, the occurrence of holes in the memory space. This accounting and status information is also referred to herein as "tracking information." In an embodiment, the tracking information can provide the following information: (1) whether an allocated memory buffer is in use, free, or reserved; (2) the memory channel/memory bank granularity of the allocated memory buffer; (3) a sequence identifier associated with the allocated memory buffer; and, (4) a performance parameter for the allocated memory buffer. The sequence identifier and the performance parameter associated with the allocated memory buffer are described in further detail below.

Figure 4:
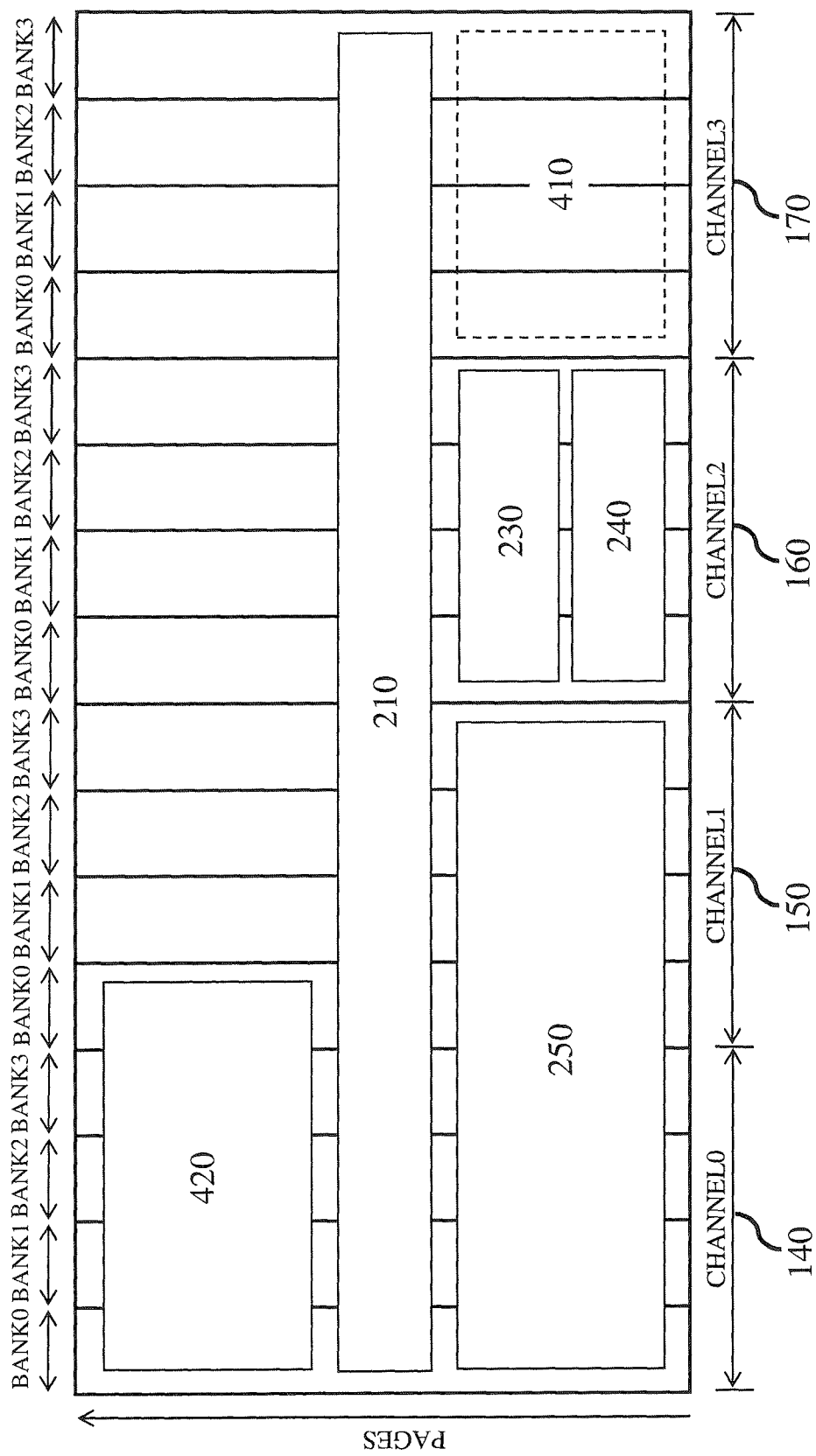
FIG. 4 is an illustration of an example scenario in which an available memory space is smaller than a memory buffer requested from a computing device.

FIG. 4 is an illustration of an example scenario in which an available memory space 410 is smaller than a memory buffer 420 requested from computing device 110 or 120. In an embodiment, in order to utilize the full bandwidth of all of the memory channels (e.g., memory channels 140-170), it is desirable and optimal to allocate memory buffer 420 into available memory space 410. Memory management unit 310 of FIG. 3 is configured to track the allocation of memory space to memory buffers associated with the operations of computing devices 110 and 120 of FIG. 1 such that the tracking information can be used in memory space allocations for future operations, according to an embodiment of the present invention. For instance, in the example scenario illustrated in FIG. 4, the tracking information maintained by memory management unit 310 can be used to adjust the memory space allocation of memory buffers 210, 230, 240, and 250 for future operations of the computing device such that memory buffer 420 can be allocated across memory banks 0-3 of memory channel 170 (e.g., similar to the memory buffer arrangement illustrated in FIG. 2). As a result, the full bandwidth of the memory channels in multi-client computing system 100 of FIG. 1 can be utilized, thus leading to an improvement in power and efficiency in multi-client computing system 100.

In reference to FIG. 3, memory management unit 310 is also configured to allocate one or more memory buffers to operations associated with computing devices 110 and 120 of FIG. 1 based on a workload expectation of computing devices 110 and 120. In an embodiment, computing device 110 is a GPU and requests one or more memory buffers to execute one or more GPU operations at a particular bandwidth or rate. Based on the type of GPU operation requested by computing device 110 (e.g., GPU), memory management unit 310 can allocate an appropriate amount of memory space and memory buffer for the GPU operations. For example, in reference to FIG. 2, a video decode pipeline operation can be performed using memory buffers 220, 230, 240, and 250. Memory buffer 250 can be used, for example, in a static screen state of the video decode pipeline. Memory buffers 230 and 240 can be used for internal use by a video decoder in the pipeline. Further, memory buffer 220 can be used, for example, in write operations by the video decoder and read operations from one or more graphics blocks in the video decode pipeline.

Each of memory buffers 220, 230, 240, and 250 can be assigned a sequence identifier, according to an embodiment of the present invention. In an embodiment, the sequence identifier provides a reference for memory controller 130 and memory devices 140, 150, 160, and 170 of FIG. 1, in which the reference is an indicator on an address/access sequence for the allocated memory buffers. For example, in returning to the video decode pipeline example above, a sequence identifier of '1' can be assigned to memory buffer 250 and the static screen state operation of the video decode pipeline. A sequence identifier of '2' can be assigned to memory buffer 240 and the video decoder's internal operation. A sequence identifier of '3' can be assigned to memory buffer 230 and the write operations by the video decoder and the read operations from the one or more graphics blocks. Further, a sequence identifier of '4' can be assigned to memory buffer 220 and the video decoder's internal operation.

For a portion of the video decode pipeline operation, memory controller 130 and memory devices 140-170 may address/access memory buffers 220, 230, 240, and 250 in a particular sequence, according to an embodiment of the present invention. The sequence identifiers of memory buffers 220, 230, 240, and 250 can be used as parameters for the particular sequence. For example, if the particular sequence is '1', '2', and '4', memory buffer 250 will be addressed/accessed first, memory buffer 240 will be addressed/accessed second, and memory buffer 220 will be addressed/accessed last. In another example, if the particular sequence is '1', '3', and '4', memory buffer 250 will be addressed/accessed first, memory buffer 230 will be addressed/accessed second, and memory buffer 220 will be addressed/accessed last. In both of these examples, the particular sequences do not have '2' and '3' occurring one after another. As a result, memory bank contention issues are not only reduced, or avoided, in memory channel 160, but the full bandwidth of the memory channels in multi-client computing system 100 can also be utilized.

In instances where memory management unit 310 does not have information on the workload expectation of computing devices 110 and 120, a default memory buffer arrangement can be used for operations associated with computing devices 110 and 120, according to an embodiment of the present invention. In an embodiment, the default memory buffer arrangement can span across all memory banks of and across all memory channels. An example of this memory buffer arrangement is illustrated as memory buffer 210 of FIG. 2, which spans across all memory banks 0-3 and across all memory channels 140-170.

In addition to assessing the workload expectation of computing devices 110 and 120, memory management unit 310 is configured to operate each of memory channels 140, 150, 160, and 170 at a particular operating frequency. As a result, the bandwidth per memory channel can be assessed based on the allocated memory buffers across one or more of the memory channels. For instance, based on a particular arrangement of memory buffers across memory channels 140, 150, 160, and 170 (e.g., memory buffers 210, 220, 230, 240, and 250 of FIG. 2), the clock frequency of each of the memory channels can either be increased or decreased to assess whether the performance (e.g., throughput) of multi-client computing system 100 of FIG. 1 improves based on the arrangement of memory buffers. Based on this information, an optimal clock frequency can be used for one or more memory channels associated with one or more memory buffers such that memory operations associated with the computing devices can be optimized. In an embodiment, the performance parameter portion of the tracking information (described above) includes the optimal clock frequency for each of memory channels 140, 150, 160, and 170.

In reference to FIG. 3, scheduler 320 is configured to process memory requests from memory management unit 310. In an embodiment, scheduler 320 processes the memory requests based on the tracking information provided by memory management unit 310. As discussed above, in an embodiment, the tracking information can provide the following information: (1) whether an allocated memory buffer is in use, free, or reserved; (2) the memory channel/memory bank granularity of the allocated memory buffer; (3) a sequence identifier associated with the allocated memory buffer; and, (4) a performance parameter for the allocated memory buffer. Based on this tracking information, scheduler 320 generates an address, command, and control signals necessary to send read and write operations to memory channels 140, 150, 160, and 170 via data buses 141, 151, 161, and 171, respectively, of FIG. 1. The generation of address, command, and control signals corresponding to read and write memory requests from computing devices 110 and 120 of FIG. 1 is known to a person skilled in the relevant art.

In an embodiment, scheduler 320 operates in conjunction with memory management unit 310 to sort threads of arbitration between computing devices 110 and 120 of FIG. 1. In an embodiment, memory controller 130 of FIG. 1 can manage two threads of arbitration—one thread of arbitration allocated to memory requests from computing device 110 and another thread of arbitration allocated to memory requests from computing device 120. Scheduler 320 can be optimized by processing the memory requests of one computing device before the other computing device. For instance, if computing device 110 is a CPU and computing device 120 is a GPU, scheduler 320 can process the CPU-related memory requests before GPU-related memory requests since CPU performance is typically more sensitive to memory delay than GPU performance. Here, scheduler 220 provides control of system bus 180 of FIG. 1 to computing device 110 such that the data transfer associated with the CPU-related memory request takes priority over the data transfer associated with the GPU-related memory request, according to an embodiment of the present invention.

In an embodiment, after an operation associated with computing devices 110 and 120 of FIG. 1 is executed (e.g., using memory buffers 210-250 of FIG. 2), memory management unit 310 of FIG. 3 de-allocates the one or more memory buffers associated with the operation from the memory space. At this point, memory management unit 310 can allocate the free memory space to other memory buffers associated with operations of computing devices 110 and 120. Memory management unit 310 can allocate the free memory space to the other memory buffers in the same arrangement as (e.g., same number of banks and channels allocated to memory buffers associated with the previous operation) or in a different arrangement from (e.g., different number of banks and channels allocated to the other memory buffers associated with the previous operation) as the previous operation. Memory management unit 310 is configured to allocate the other memory buffers to the operations of computing devices 110 and 120 in the same manner described above with respect to FIG. 3.

Figure 5:
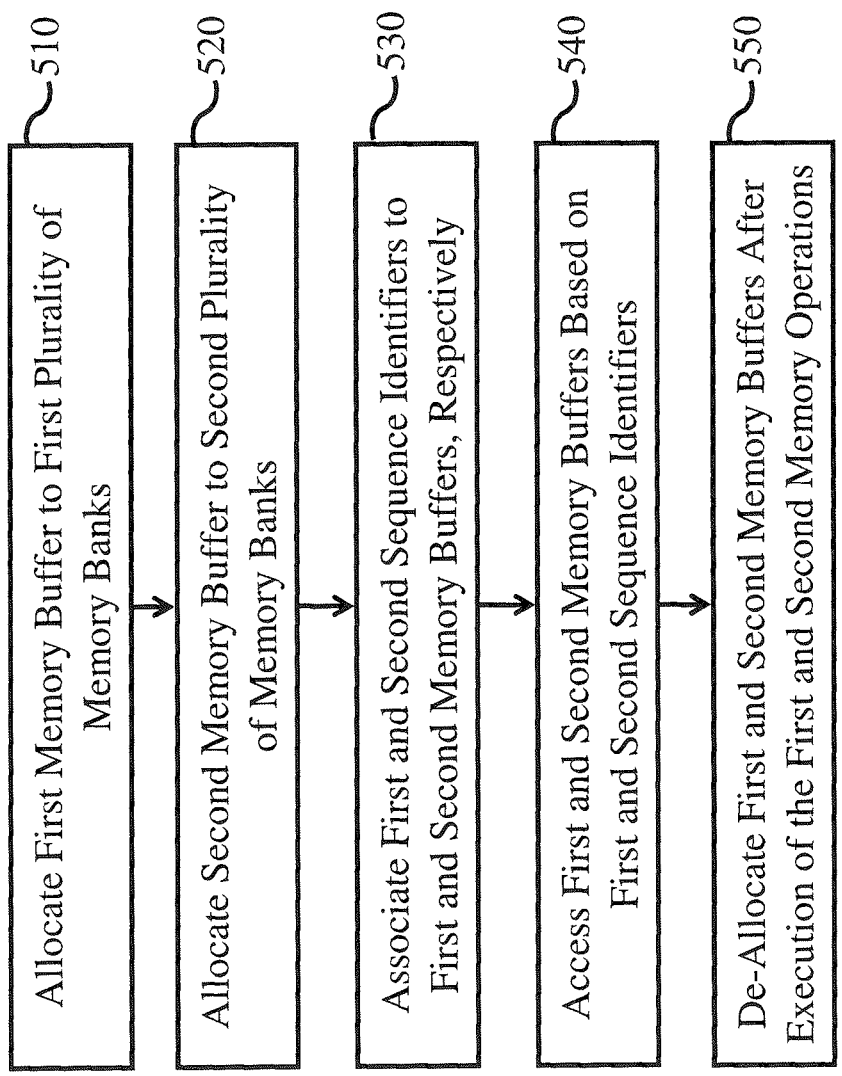
FIG. 5 is an illustration of an embodiment of a method for allocating one or more memory buffers in a computing system with a plurality of memory channels.

FIG. 5 is an illustration of an embodiment of a method 500 for allocating one or more memory buffers in a computing system with a plurality of memory channels. Method 500 can occur using, for example and without limitation, multi-client computing system 100 of FIG. 1.

In step 510, a first memory buffer is allocated to, or associated with, a first plurality of memory banks, where the first plurality of memory banks spans over a first set of one or more memory channels. Memory management unit 310 of FIG. 3 can be used, for example, to perform step 510.

In step 520, a second memory buffer is allocated to, or associated with, a second plurality of memory banks, where the second plurality of memory banks spans over a second set of one or more memory channels. In an embodiment, the second plurality of memory banks is different from the first plurality of memory banks (in step 510). In another embodiment, the second plurality of memory banks is the same as the first plurality of memory banks. Memory management unit 310 of FIG. 3 can be used, for example, to perform step 520.

In step 530, a first sequence identifier and a second sequence identifier are associated with the first memory buffer and the second memory buffer, respectively. Memory management unit 310 of FIG. 3 can be used, for example, to perform step 530.

In step 540, the first and second memory buffers are accessed based on the first and second sequence identifiers. In an embodiment, the first and second memory buffers are accessed in sequence to avoid memory bank contention and to utilize a full bandwidth of the plurality of memory channels. Memory management unit 310 and scheduler 320 of FIG. 3 can be used, for example, to perform step 540.

Further, in an embodiment, when executing a first memory operation associated with the first memory buffer and a second memory operation associated with the second memory buffer, the first and second memory operations are executed at a first operating frequency and a second operating frequency, respectively. The first and second operating frequencies are different from one another, according to an embodiment of the present invention.

In step 550, after the first and second memory operations associated with the first and second memory buffers, respectively, are executed, the first and second memory buffers are de-allocated from their respective memory spaces. With the de-allocation of the first and second memory buffers, memory buffers associated with other memory operations can be allocated to the free memory space.

Figure 6:
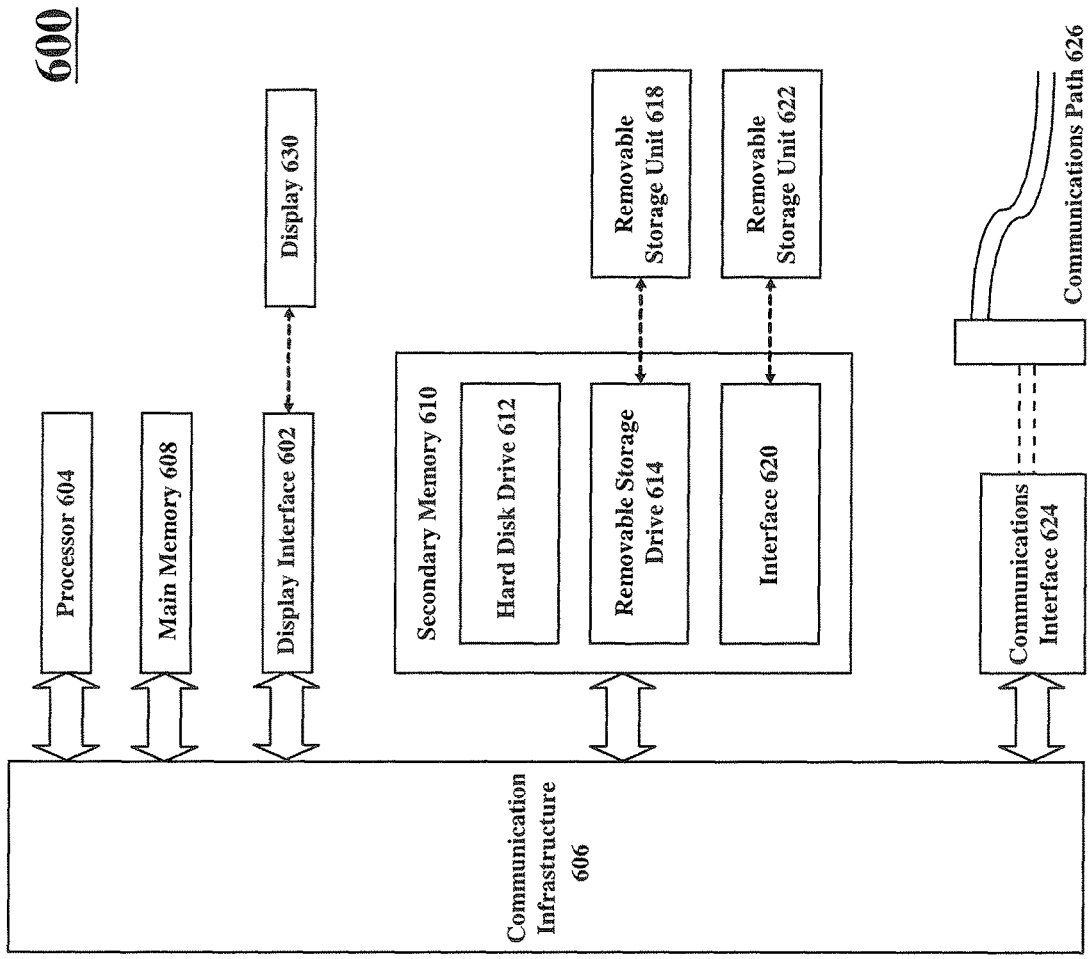
FIG. 6 is an illustration of an example computer system in which embodiments of the present invention can be implemented.

Various aspects of the present invention may be implemented in software, firmware, hardware, or a combination thereof. FIG. 6 is an illustration of an example computer system 600 in which embodiments of the present invention, or portions thereof, can be implemented as computer-readable code. For example, the method illustrated by flowchart 500 of FIG. 5 can be implemented in system 600. Various embodiments of the present invention are described in terms of this example computer system 600. After reading this description, it will become apparent to a person skilled in the relevant art how to implement embodiments of the present invention using other computer systems and/or computer architectures.

It should be noted that the simulation, synthesis and/or manufacture of various embodiments of this invention may be accomplished, in part, through the use of computer readable code, including general programming languages (such as C or C++), hardware description languages (HDL) such as, for example, Verilog HDL, VHDL, Altera HDL (AHDL), or other available programming and/or schematic capture tools (such as circuit capture tools). This computer readable code can be disposed in any known computer-usable medium including a semiconductor, magnetic disk, optical disk (such as CD-ROM, DVD-ROM). As such, the code can be transmitted over communication networks including the Internet. It is understood that the functions accomplished and/or structure provided by the systems and techniques described above can be represented in a core (such as a GPU core) that is embodied in program code and can be transformed to hardware as part of the production of integrated circuits.

Computer system 600 includes one or more processors, such as processor 604. Processor 604 may be a special purpose or a general purpose processor. Processor 604 is connected to a communication infrastructure 606 (e.g., a bus or network).

Computer system 600 also includes a main memory 608, preferably random access memory (RAM), and may also include a secondary memory 610. Secondary memory 610 can include, for example, a hard disk drive 612, a removable storage drive 614, and/or a memory stick. Removable storage drive 614 can include a floppy disk drive, a magnetic tape drive, an optical disk drive, a flash memory, or the like. The removable storage drive 614 reads from and/or writes to a removable storage unit 618 in a well known manner. Removable storage unit 618 can comprise a floppy disk, magnetic tape, optical disk, etc. which is read by and written to by removable storage drive 614. As will be appreciated by persons skilled in the relevant art, removable storage unit 618 includes a computer-usable storage medium having stored therein computer software and/or data.

In alternative implementations, secondary memory 610 can include other similar devices for allowing computer programs or other instructions to be loaded into computer system 600. Such devices can include, for example, a removable storage unit 622 and an interface 620. Examples of such devices can include a program cartridge and cartridge interface (such as those found in video game devices), a removable memory chip (e.g., EPROM or PROM) and associated socket, and other removable storage units 622 and interfaces 620 which allow software and data to be transferred from the removable storage unit 622 to computer system 600.

Computer system 600 can also include a communications interface 624. Communications interface 624 allows software and data to be transferred between computer system 600 and external devices. Communications interface 624 can include a modem, a network interface (such as an Ethernet card), a communications port, a PCMCIA slot and card, or the like. Software and data transferred via communications interface 624 are in the form of signals which may be electronic, electromagnetic, optical, or other signals capable of being received by communications interface 624. These signals are provided to communications interface 624 via a communications path 626. Communications path 626 carries signals and can be implemented using wire or cable, fiber optics, a phone line, a cellular phone link, a RF link or other communications channels.

In this document, the terms "computer program medium" and "computer-usable medium" are used to generally refer to media such as removable storage unit 618, removable storage unit 622, and a hard disk installed in hard disk drive 612. Computer program medium and computer-usable medium can also refer to memories, such as main memory 608 and secondary memory 610, which can be memory semiconductors (e.g., DRAMs, etc.). These computer program products provide software to computer system 600.

Computer programs (also called computer control logic) are stored in main memory 608 and/or secondary memory 610. Computer programs may also be received via communications interface 624. Such computer programs, when executed, enable computer system 600 to implement embodiments of the present invention as discussed herein. In particular, the computer programs, when executed, enable processor 604 to implement processes of embodiments of the present invention, such as the steps in the methods illustrated by flowchart 500 of FIG. 5, discussed above. Accordingly, such computer programs represent controllers of the computer system 600. Where embodiments of the present invention are implemented using software, the software can be stored in a computer program product and loaded into computer system 600 using removable storage drive 614, interface 620, hard drive 612, or communications interface 624.

Embodiments of the present invention are also directed to computer program products including software stored on any computer-usable medium. Such software, when executed in one or more data processing device, causes a data processing device(s) to operate as described herein. Embodiments of the present invention employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

While various embodiments of the present invention have been described above, it should be understood that they have been presented by way of example only, and not limitation. It will be understood by persons skilled in the relevant art that various changes in form and details can be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for improving bus efficiency of a computer system, the method comprising:
    maintaining tracking information for utilization of a memory that includes a first plurality of memory banks, a second plurality of memory banks and a third plurality of memory banks, wherein the tracking information includes indications of whether memory buffers allocated within the memory are in use, free, or reserved;
    allocating a first memory buffer to the first plurality of memory banks;
    allocating a second memory buffer to the second plurality of memory banks, where the second plurality of memory banks spans multiple memory channels;
    in response to receiving a request for a third memory buffer, reallocating the first memory buffer and the second memory buffer based on the indications included in the tracking information;
    allocating the third memory buffer to the third plurality of memory banks;
    updating one or more clock frequencies of the one or more of the multiple memory channels based on the reallocating of the first memory buffer and the second memory buffer;
    associating a first sequence identifier to the first memory buffer;
    associating a second sequence identifier to the second memory buffer; and
    accessing the first memory buffer and the second memory buffer based on the first sequence identifier and the second sequence identifier.

2. The method of claim 1, wherein:
    the first plurality of memory banks to which the first memory buffer is allocated spans no more than one memory channel.

3. The method of claim 2, wherein the third plurality of memory banks are allocated to span no more than one memory channel that is a same memory channel to which the first memory buffer is allocated.

4. The method of claim 3, further comprising:
    due to the third memory buffer being allocated to memory banks that span no more than one channel that is the same memory channel to which the first memory buffer is allocated, not accessing the first memory buffer and the third memory buffer consecutively.

5. The method of claim 1, further comprising:
    deallocating the first memory buffer and the second memory buffer after accessing the first memory buffer and the second memory buffer.

6. The method of claim 1, further comprising:
    mapping memory buffers for latency-sensitive CPU instruction code to the first memory buffer.

7. The method of claim 1, further comprising:
    allocating the first memory buffer to graphics processing unit ("GPU") operations associated with frame buffering;
    allocating the second memory buffer to GPU operations associated with video decoding; and
    allocating the third memory buffer to GPU operations associated with a static screen state.

8. The method of claim 1, wherein the updating is performed by adjusting one or more clock frequencies of memory channels over which the memory banks for the first memory buffer and the memory banks for the second memory buffer are allocated in order to assess whether performance improves.

9. The method of claim 1, wherein accessing the first memory buffer and the second memory buffer based on the first sequence identifier and the second sequence identifier comprises accessing the first memory buffer and the second memory buffer in sequence to avoid memory bank contention and to utilize a full bandwidth of the memory channels.

10. A computing system that improves bus efficiency, the system comprising:
a first computing device;
a second computing device;
a plurality of memory channels; and
a memory controller configured to:
maintain tracking information for utilization of the plurality of memory channels, wherein the tracking information includes indications of whether memory buffers allocated within the memory are in use, free, or reserved;
allocate a first memory buffer to a first plurality of memory banks;
allocate a second memory buffer to a second plurality of memory banks, where the second plurality of memory banks spans multiple memory channels;
in response to receiving a request for a third memory buffer, perform a reallocation of the first memory buffer and the second memory buffer based on the indications included in the tracking information;
allocate the third memory buffer to a third plurality of memory banks;
update one or more clock frequencies of the one or more of the multiple memory channels based on the reallocation of the first memory buffer and the second memory buffer;
associate a first sequence identifier to the first memory buffer;
associate a second sequence identifier to the second memory buffer; and
access, by one or both of the first computing device and the second computing device, the first memory buffer and the second memory buffer based on the first sequence identifier and the second sequence identifier.

11. The computing system of claim 10, wherein:
the first plurality of memory banks to which the first memory buffer is allocated spans no more than one memory channel.

12. The computing system of claim 11, wherein the third plurality of memory banks are allocated to span no more than one memory channel that is a same memory channel to which the first memory buffer is allocated.

13. The computing system of claim 12, wherein the memory controller is further configured to:
due to the third memory buffer being allocated to memory banks that span no more than one channel that is the same memory channel to which the first memory buffer is allocated, not access the first memory buffer and the third memory buffer consecutively.

14. The computing system of claim 10, wherein the memory controller is further configured to:
deallocate the first memory buffer and the second memory buffer after accessing the first memory buffer and the second memory buffer.

15. The computing system of claim 10, wherein the memory controller is further configured to:
map memory buffers for latency-sensitive CPU instruction code to the first memory buffer.

16. The computing system of claim 10, wherein the memory controller is further configured to:
allocate the first memory buffer to graphics processing unit ("GPU") operations associated with frame buffering;
allocate the second memory buffer to GPU operations associated with video decoding; and
allocate the third memory buffer to GPU operations associated with a static screen state.

17. The computing system of claim 10, wherein the one or more clock frequencies are updated by adjusting one or more clock frequencies of memory channels over which the memory banks for the first memory buffer and the memory banks for the second memory buffer are allocated in order to assess whether performance improves.

18. The computing system of claim 10, wherein accessing the first memory buffer and the second memory buffer based on the first sequence identifier and the second sequence identifier comprises accessing the first memory buffer and the second memory buffer in sequence to avoid memory bank contention and to utilize a full bandwidth of the memory channels.

19. A memory controller that improves bus efficiency of a computer system, the memory controller configured to:
maintain tracking information for utilization of a memory that includes a first plurality of memory banks, a second plurality of memory banks and a third plurality of memory banks, wherein the tracking information includes indications of whether memory buffers allocated within the memory are in use, free, or reserved;
allocate a first memory buffer to the first plurality of memory banks;
allocate a second memory buffer to the second plurality of memory banks, where the second plurality of memory banks spans multiple memory channels;
in response to receiving a request for a third memory buffer, perform a reallocation of the first memory buffer and the second memory buffer based on the indications included in the tracking information;
allocate the third memory buffer to the third plurality of memory banks;
update one or more clock frequencies of the one or more of the multiple memory channels based on the reallocation of the first memory buffer and the second memory buffer;
associate a first sequence identifier to the first memory buffer;
associate a second sequence identifier to the second memory buffer; and
access the first memory buffer and the second memory buffer based on the first sequence identifier and the second sequence identifier.

20. The memory controller of claim 19, wherein the memory controller is further configured to:
deallocate the first memory buffer and the second memory buffer after accessing the first memory buffer and the second memory buffer.

* * * * *